US006391928B1

(12) United States Patent
Rajasekharan et al.

(10) Patent No.: US 6,391,928 B1
(45) Date of Patent: May 21, 2002

(54) PROCESS FOR PREPARING A NOVEL SYNERGISTIC SOLID/SEMI-SOLID ORGANIC COMPOSITION

(75) Inventors: Ram Rajasekharan; Jaiyanth Daniel, both of Karnataka (IN)

(73) Assignees: Indian Institute of Science, Karnataka; Nagarjuna Holding Private Limited, Andhra, both of (IN)

( * ) Notice: Subject to any disclaimer, the term of this patent is extended or adjusted under 35 U.S.C. 154(b) by 0 days.

(21) Appl. No.: 09/570,539

(22) Filed: May 12, 2000

Related U.S. Application Data

(60) Provisional application No. 60/149,443, filed on Aug. 18, 1999.

(51) Int. Cl.[7] .................... A23L 1/05; A23L 1/221; B01D 21/01; C08J 3/04; C10L 7/00
(52) U.S. Cl. .................. 516/108; 44/266; 44/268; 210/799; 426/573; 426/651; 514/944; 516/109; 516/138
(58) Field of Search .................... 516/47, 104, 108, 516/109, 138; 44/266, 268; 514/944; 507/921; 426/573, 651; 210/799

(56) References Cited

U.S. PATENT DOCUMENTS

| 919,759 | A | * | 4/1909 | Perelzveich et al. | 44/266 X |
|---|---|---|---|---|---|
| 993,446 | A | * | 5/1911 | Fulton | 44/266 |
| 2,719,782 | A | * | 10/1955 | Vaterrodt | 516/104 X |
| 3,210,248 | A | * | 10/1965 | Feldmann et al. | 516/108 X |
| 3,285,718 | A | * | 11/1966 | Whitfield et al. | 44/266 |
| 3,378,418 | A | * | 4/1968 | Lissant | 516/138 |
| 4,502,975 | A | * | 3/1985 | Kobayashi et al. | 516/109 X |
| 5,096,697 | A | * | 3/1992 | Adachi et al. | 514/944 X |
| 5,468,261 | A | * | 11/1995 | Kalocsai | 44/268 |
| 5,552,136 | A | * | 9/1996 | Motley | 514/944 X |
| 5,908,377 | A | * | 6/1999 | Fukuda | 516/108 X |
| 5,965,113 | A | * | 10/1999 | Guskey | 514/944 X |

* cited by examiner

*Primary Examiner*—Richard D. Lovering
(74) *Attorney, Agent, or Firm*—Birch, Stewart, Kolasch & Birch, LLP

(57) ABSTRACT

This invention relates to a novel synergistic reversible solid/semi-solid organic composition, said composition comprising (a) at least one saturated long chain fatty acid and/or its glycerol esters and (b) one or more liquid neutral organic compounds, said ingredients (a) and (b) being present in a ratio between 0.1 to 40% by weight, and a process for producing said synergistic reversible solid/semi-solid organic composition by mixing the ingredients (a) and (b) defmed above in a ratio between 0.1 to 40% by weight, at a temperature between 2 to 50° C. and at a pressure in the range of 200 torr to 2500 torr.

5 Claims, No Drawings

PROCESS FOR PREPARING A NOVEL SYNERGISTIC SOLID/SEMI-SOLID ORGANIC COMPOSITION

This application claims priority on provisional Application No. 60/149,443 filed on Aug. 18, 1999, the entire contents of which are hereby incorporated by reference.

FIELD OF INVENTION

The present invention relates to a novel synergistic solid/semi solid organic composition, a process for producing such organic composition and a method of solidifying liquid neutral organic compounds using lipid modulators. Preferably, the present invention provides a method of solidification, isolation, identification and/or separation of liquid neutral organic compounds and/or mixture of organic molecules or colloids. Most preferably, the invention encompasses lipid-modulated alteration of the physical properties of vegetable oils, essential oils, mineral oils and organic solvents.

BACKGROUND OF THE INVENTION

In the field of organic chemistry, many of the organic compounds are in various physical states depending on their molecular structures and the surrounding temperatures and pressure. Organic compounds are chemical compounds containing carbon atoms arranged in chains or rings, together with smaller amounts of other elements, mainly hydrogen and oxygen. These organic compounds are present either in liquid, solid or gaseous form at ambient temperature. These organic compounds may be negatively or positively charged or devoid of charge. In other words, it may have a deficiency or excess of electrons on a particular object, giving rise to a positive or negative charge, respectively. Organic compounds can be saturated or unsaturated ones. These can be vegetable oils, essential oils, mineral oils, chemical solvents, etc. Organic compounds have various physical properties such as color, odor, physical state, solubility, melting point, boiling point, freezing point etc., and alteration of one or more of such properties are required in order to make them suitable for specific industrial usage or application. In other words, modification of physical state of the organic compounds is essential/desirable for their various applications in the industry.

Organic.compounds include a group of compounds referred to as fatty acids, fatty alcohols and sterols which were originally found to be constituents of microbial, animal and vegetable fats and fatty oils. Alternatively, the fatty acids, fatty alcohols and sterols can also be synthesized chemically. The esters of fatty acids are their derivatives with alcohol.

PRIOR ART

The art is rich in use of compounds isolated from Garcinia indica for several processes as described in the following patents and publications:

Chen S, Wan M, Lok B N (1996) Planta Medica 62:381. Reddy S Y, Prabhakar JV (1994) J Am Oil Chem Soc 71:217. Sundaram B M, Gopalakrishnan C, Subramanian S, Shankaranarayan D (1983) Planta Medica 4:59. The art is also rich in proposing kokum and mahua fats as substitutes for cocoa butter for Chocolate industry (Yasuda et al. 1979, U.S. Pat. No. 4,157,405; Pairaud et al. 1982, U.S. Pat. No. 4,348,432). The art is also rich in the process of conversion of vegetable oil into fat by chemical hydrogenation (Gunstone F D, Harwood-J L, Padley F B (1994) The Lipid Handbook ($2^{nd}$ ed), Chapman and Hall, Madras). However, there is no description of altering the physical properties of any liquid neutral organic compounds such as vegetable oils, essential oils, mineral oils and organic solvents in a temperature-dependent manner using fatty acids or glycerol esters of fatty acids isolated from Garcinia indica. There is no report on a process of biological conversion of liquid oils to a solid or semi-solid using lipid(s) isolated from plants such as Garcinia indica. There is also no description of using free fatty acids, fatty alcohols, dicarboxylic acids (adipic, suberic, sebacic acid), cholesterol and its derivatives to solidify, isolate, identify or separate any liquid neutral organic compound in prior art. However, there are a few methods of solidifying liquid oils using fatty acyl wax esters (U.S. Pat. No. 5,763,497) and paraffin wax esters (U.S. Pat. No. 5,476,993) and hydroxyalkanoic acids (U.S. Pat. No. 5,908,377).

U.S. Pat. No. 5,476,993 discloses a process of reversibly solidifying hydrocarbons for transportation and storage. This process involves mixing hydrocarbons like crude oil with a hydrocarbon wax. The wax is melted and heated to a temperature above the solidification temperature for the mixture and mixed with the oil. The disadvantage of this process is that it employs large quantities of wax and is restricted to solidifying only crude oil that later under goes fractional distillation to separate various fractions. In addition, there is no mention of the use of hydrocarbon wax to solidify edible oils, essential oils and organic solvents.

Another U.S. Pat. No. 5,763,497, of 1998 discloses an oil-in-water type cosmetic composition comprising water, fatty acyl wax esters, and at least one of other components usable in cosmetics. However, the above method is not reversible and also involves more active components. In addition, this method has a restrictive application and not suitable for solidifying all kinds of oils and organic solvents.

Yet another U.S. Pat. No. 5,908,377 of 1999 discloses a method of solidifying liquid oils without heating the liquid oil, using a solidifying agent which includes a gel-in-oil forming material and a temporarily protective material for the gel-in-oil forming material. This method, as disclosed, has several disadvantages such as employing at least two components to prepare the solidifying agent, using hydroxystearic acids which are not suitable in food and related applications, etc. These hydroxyalkanoic long chain fatty acids are only available in minute quantities in nature and it is totally uneconomical to isolate from natural resources for any commercial use. On the other hand, these acids are very expensive to chemically synthesize them. Further, ricinoleic acid (12-hydroxy-cis-9-octadecenoic acid) does not exhibit the solidification property. Furthermore, the above process does not envisage reversibility and is restricted to solidifying waste edible oils or waste engine oils to contain environmental pollution. In addition, the method is directed towards avoiding pollution of drains, rivers, lakes by waste edible oils and does not involve reversing the method. Moreover, this method does not result in uniform/homogenous solidification.

SUMMARY OF THE INVENTION

To over come the above problems, the present invention provides a novel synergistic solid/semi-solid organic composition comprising (a) at least one saturated long chain fatty acid and/or its glycerol esters, or at least one saturated long chain fatty alcohols, or at least one dicarboxylic acid, or at least one sterol or mixtures thereof and (b) one or more liquid neutral organic compounds, said ingredients (a) being present in a ratio between 0.1 to 40 percent by weight and the remaining part from (b); and a process for producing the reversing synergistic solid/semi-solid composition.

OBJECTS OF THE INVENTION

The main object of the invention is to provide a novel, reversible and synergistic solidisemi-solid composition.

Another object of the invention is to provide a synergistic solid/semi-solid organic composition comprising (a) at least one saturated long chain fatty acid and/or its glycerol esters, or at least one saturated long chain fatty alcohols, or at least one dicarboxylic acid, or at least one sterol or mixtures thereof and (b) one or more liquid neutral organic compounds.

One more object of the invention relates to a solidification of uncharged organic liquid by physical method which method is reversible.

Yet another object of the invention relates to a process for producing a novel, reversible and synergistic solid/semi-solid composition.

Still another object of the invention is to provide a reversible process for producing a novel, reversible and synergistic solid/semi-solid composition.

DETAILED DESCRIPTION OF THE INVENTION

Our investigations to obtain insights into the mechanism of solid fat biosynthesis and accumulation in *Garcinia indica*, eventually led to the present invention. Table 1 represents the analysis of fatty acid composition of Triacylglycerols (TAG) obtained from mature kokum (*G. indica*) seeds at 120 days after flowering. The TAG contained more than 59% of stearic acid (C.sub.18:0) and 35% of oleic acid (C.sub.18:1).

TABLE 1

Fatty Acid Composition of Triacylglycerols in Mature Seeds of *G. indica*

| Age of Seeds | Fatty Acid Composition (Percentage by Weight) | | | | |
|---|---|---|---|---|---|
| (DAF) | C16:0 | C18:0 | C18:1 | C18:2 | C20:0 |
| 120 | 4.6 | 59.3 | 35.3 | 0.1 | 0.7 |

The solid oil from kokum seed was mixed with various neutral liquid organic compounds and the tubes were heated to melt the fat and kept at 4 deg. C after mixing. It was observed that the liquid organic compounds were solidified. Once the organic is solidified at 4 deg. celsius it remains solid at NTP. The solidified locate can be reconverted into liquid of identical nature by simple physical process. Therefore, the present solidification process does not involve any chemical reaction. The percentage of kokum fat required for such a solidification process is given in Table 2a.

TABLE 2a

Percent Kokum Fat Required for Solidification of Organic Liquids at Four Degrees Celsius

| Organic Liquid | Percent Kokum Fat |
|---|---|
| Sunflower Oil | 10 |
| Lavender Oil | 15 |
| Petrol | 20 |
| Kerosene | 20 |
| Acetone | 20 |

Fractionation of Kokum Fat to Identify the Solidification Principle

The lipid catalyst or the solidifying agent was purified from kokum fat using various column chromatographic procedures and C18 reverse phase High Performance Liquid Chromatography. The structure of the purified compound was elucidated.

Aliquot from the purified triacylglycerol was subjected to alkaline hydrolysis, acidified and the free fatty acids were extracted with petroleum ether [Kates M. (1964) J. Lipid Res. 5, 132–135]. The free fatty acid fraction and the water soluble deacylated fractions were used separately for solidifiing vegetable oil. In these experiments, petroleum ether fraction showed solidification property and the water-soluble deacylated fraction did not show vegetable oil solidifiing property. The hydrolyzed products were purified using HPLC (C18-reverse phase column). The purified compounds were identified as saturated fatty acids (stearic and palmitic acids). The purified saturated fatty acids were capable of solidifying liquid vegetable oils, essential oils, mineral oil and organic solvents. These experiments suggested that the free fatty acids were capable of solidifying oil.

Alternatively, free fatty acids were obtained from kokum fat by enzymatic (lipase) hydrolysis and tested for solidifying property. The free fatty acids from kokum fat showed solidifying activity.

The fatty acids obtaineom kokum fat were fractionated intomvidual fatty acids on C.sub.18 reverse phase silica thin layer chromatography. Individual fatty acids were eluted from the thin layer chromatogram plates, used for solidification activity, and found to exhibit the similar property.

The present invention describes a simple and a cost-effective method of altering physical properties of liquid neutral organic compounds by using one or more fatty acids their glycerol esters, fatty alcohols, dicarboxylic acids, sterols and mixtures thereof without involving chemical reactions.

One embodiment of the invention provides a novel synergistic solid/semi-solid organic composition, said composition comprising (a) at least one saturated long chain fatty acid and/or its glycerol ester, or at least one saturated long chain fatty alcohol, or at least one dicarboxylic acid, or at least one sterol or mixtures thereof and (b) a liquid neutral organic compound, said ingredient (a) being present in an amount between 0.1 to 40 percent by weight.

Another embodiment of the invention relates to a process for producing a novel synergistic solid/semi-solid organic composition, said process comprising mixing (a) at least one saturated long chain fatty acid and/or its glycerol ester, or at least one saturated long chain fatty alcohol, or at least one dicarboxylic acid, or at least one sterol or mixtures thereof in an amount between 0.1 to 40 percent by weight with (b) a liquid neutral organic compound. It is also possible to perform the process at varying pressures with corresponding modification in respect of other parameters of the process. The pressure can vary between 200 torr to 2500 torr.

Yet another embodiment of the invention relates to a method of solidifying liquid neutral organic compounds or their mixtures, said method comprising adding one or more fatty acids having a chain length of C.sub.10 to C.sub.31, their glycerol esters or both or at least one saturated long chain fatty alcohol, or at least one dicarboxylic acid, or at least one sterol or mixtures thereof at a concentration of 0.1 to 40% with the said liquid neutral organic compounds or their mixtures.

The preferred fatty acids employed in the present invention can be selected from decanoic acid, hendecanoic acid, aminohendecanoic acid, dodecanoic acid, aminododecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid and hentriacontanoic acid. The preferred esters of this invention can be selected from trilaurin, trimyristin, tripalmitin, tristearin and tribehenin and mixtures thereof.

The preferred liquid neutral organic compounds used in the present invention can be selected from vegetable oils such as coconut oil, groundnut oil, olive oil, palm oil, mustard oil, sunflower oil, neem oil, cottonseed oil, rapeseed oil, soybean oil, sesame oil, corn oil, castor oil, safflower oil, rice bran oil, linseed oil, corn oil, poppy oil, fish oil, tall oil and tung oil; essential oils such as mint oil, camphor oil, cinnamon oils, citrus oil, lemon oil, orange oil, cyprus oil, eucalyptus oil, geranium oil, jasmine oil, lavender oil, lemon grass oil, rose oil, sandalwood oil, turpentine oil, clove oil, pepper oil and cardamom oil;. mineral oils such as crude fossil oil, petroleum, diesel and kerosene; and neutral organic solvents such as mono-, di- or tri-hydric alcohols, acetone, acetonitrile, aniline, benzene, butanol, n-butyl acetate, carbon disulfide, cyclohexane, diethyl ether, N,N-dimethylformamide, dimethyl sulfoxide, 1,4-dioxan, ethanol, ethyl acetate, ethylene glycol, ethylene glycol monoethyl ether, ethylene glycol monomethylether, ethyl methyl ketone, methanol, I-propanol, pyridine, toluene and xylene.

In a preferred embodiment, the process comprises taking a required part of the fatty acids or their glycerol esters or at least one saturated long chain fatty alcohol, or at least one dicarboxylic acid, or at least one sterol or mixtures thereof in an appropriate vessel with a required part of the desired liquid neutral organic compound followed by heating the mixture and mixing both the liquids thoroughly. The mixture is gradually allowed to solidify at ambient teinperature or allowed to cool and solidify at a temperature in the range of 2 deg. C to 10 deg. C or allowed to cool down at a controlled rate of 0.1 deg. C to 1 deg. C per minute to enhance thermal stability.

In another embodiment, the process comprises taking a required part of the fatty acids or their glycerol esters or at least one saturated long chain fatty alcohol, or at least one dicarboxylic acid, or at least one sterol or mixtures thereof in an appropriate vessel and heating the substance till it melts and adding such molten agent with a required part of the desired liquid neutral organic compound followed by heating the mixture and mixing both they liquids thoroughly. The mixture is gradually allowed to solidify at ambient temperature or allowed to cool and solidify at a temperature in the range of 2 deg. C to 10 deg. C or allowed to cool down at a controlled rate of 0.1 deg. C to 1 deg. C per minute to enhance thermal stability.

Preferably, the invention describes a novel process of altering the physical properties such melting and freezing points of edible oils, non edible oils, essential oils, mineral oils and organic solvents in a temperature dependent manner using fatty acids of chain length C sub. 10 to C sub. 31 and/or saturated fatty acids esters of glycerol or both or at least one saturated long chain fatty alcohol, or at least one dicarboxylic acid, or at least one sterol or mixtures thereof. One of the many advantages of this process is that it does not alter the chemical nature of the above mentioned compounds. Using this invention, the conversion of vegetable oils into higher quality vegetable fats in terms of palatability without chemical hydrogenation and the attendant trace metal contamination was achieved. With this invention, essential oils, mineral oils and organic solvents can be solidified at ambient temperatures, which have several industrial applications. The solidified oils can be used in food and feed, dairy and dairy products, cosmetics, healthcare, paints and dyes, lubricants, -petrochemical and refining, fuels, organic solvents, waxes, storing and transportation, laboratory applications, environmental protection, and several other industries.

Yet another embodiment of the invention relates to a method of solidifying oils using lipids as activators/catalysts which can find application in the manufacture of vegetable butter, margarine, ghee substitute, chocolate preparation, confectioneries, shoe polish, cosmetic lotions, lubricants, etc. It relates to a simple and economical method of obtaining solid fat without chemical hydrogenation, having physical properties that are close to those of chemically hydrogenated products. Physical properties of the lipid catalyst derived solid fats are analyzed by melting point apparatus with different percentage of lipids and the melting points of the solids so prepared were determined. One of the many advantages of the invention is that it provides a substitute process for chemical hydrogenation. Hydrogenation is a process of converting unsaturated fatty acids in liquid oils to a saturated form which in turn converts liquid oil into a solid fat useful in margarine preparation and shortening applications. The hydrogenation is an expensive process, creates undesirable trans-fatty acids, and may contain traces of metal contamination. The cost and other factors associated with chemical hydrogenation can be avoided if the vegetable oil is converted to solid fat using the lipid catalyst. To become a substitute of natural butter and chemically hydrogenated products, it must fulfill several requirements; in the first instance, its cost price should be lower than that of existing products and therefore, its method of manufacturing must be relatively simple. Secondly, the physical properties of the substitute must be comparable with other related products. Thirdly, the chemical composition of the solidified oils must be as close as possible to that of other related products or superior to the existing products. It has also been established in this invention that the chemical properties of the solidified oils remain the same such as iodine value, saponification index and fatty acid, and glyceride contents. The prepared solidified oil having low saturated fatty acids and no trans fatty acids is far superior over the hydrogenated fats and natural fats. The prepared solidified oils are especially desirable for human consumption. Common additives such as stabilizer, flavoring agent, emulsifier, anti-spattering agent, colorant, antioxidant, etc. can be added to the solidified oils of the present invention. The applicants observed that when the organic liquid is not neutral then such organic liquid does not solidify by the present method, which establishes that the present invention is restricted to solidification of uncharged liquid/solvents.

According to the present invention, the solid oils are obtained by a simple process of mixing two raw materials and the mixture is then used as such without fractionation. The products prepared in this way have physical characteristics, which are advantageous presumably because of the natural rearrangement of the various constituent molecules that were present initially.

Fatty acids (C sub. 10 to C sub. 31) and their derivatives were used as solidifying agents. Each fatty acid or fatty acid derivative was used separately and in mixture with other fatty acids/derivatives to solidify seed oils, essential oils, mineral oils and organic solvent. The minimum quantity (percent, w/w) of solidifying agent required to solidify each class of organic liquid at 25 deg. C was determined. The melting temperature of each solidified fatty acid/organic liquid mixture was determined.

It was observed that the minimum quantity (percent, w/w) of fatty acid required for the solidification of organic liquids of different classes, decreased sharply with increasing chain-length of the solidifying agent from C sub. 10 to C sub. 19 and remained more or less constant thereafter. The melting temperature of the solidified mixture increased with increasing chain length of the fatty acid that was used as solidifiing agent.

The presence of an additional carboxylic acid group at the methyl end of decanoic acid (as in sebacic acid) was found to enhance the solidification ability by more thaf ten-fold over decanoic acid. These dicarboxylic acids (C sub. 6 to C sub. 10) solidified seed oils and essential oils. However, they did not solidify mineral oils.

The ability of the agent to solidify organic liquids was enhanced by the presence of an additional hydroxyl group in the middle of the fatty acid chain. The presence of a hydroxyl group at the o-carbon (adjacent to carbonyl carbon) in C sub. 18 fatty acid was found to adversely affect the ability to solidify seed oils, as compared to stearic acid. The additional hydroxyl group in the middle of the chain was observed to play a synergistic role.

It was observed that methyl esters of hydroxystearic acids had greatly diminished solidifying abilities even though there was an intact hydroxyl group in the middle of the chain. Thus, the carbonyl hydroxyl group of the fatty acid is found to play an important role in solidification of organic liquids.

The solidifying ability of 12-hydroxystearyl alcohol was found to be nearly identical to that of 12-hydroxystearic acid (12-hydroxyoctadecanoic acid) and many fold higher than that of stearic acid. Thus, it may be proposed that two hydroxyl groups, one at the middle and the other at the end of the fatty acid chain are important factors controlling the ability of fatty acids/derivatives to solidify neutral organic liquids.

Dihydroxystearic acids with the hydroxyl groups adjacent to each other in 'threo' or 'erythro' conformation in the middle of the fatty acid chain also solidified all classes of organic liquids studied, but the same compounds showed decreased solidification ability as compared to stearic acid or 12-hydroxystearic acid. Thus, more than one hydroxyl group in the middle of the fatty acid chain was found to adversely affect the solidification ability.

The presence of an a-hydroxyl group (adjacent to the carbonyl carbon) in C sub. 20 and C sub. 22 fatty acids was found to decrease the ability of these fatty acids to solidify organic liquids. The substitution of hydrogen in the carbonyl hydroxyl with chloride decreased by five-fold, the ability of C sub. 22 fatty acid to solidify organic liquid. Thus, the carbonyl hydroxyl of the fatty acid is observed to be an important factor in the solidification of organic liquids. Since the fatty alcohol does not possess a carbonyl group, which was found to solidify all organic liquids at minimal percentages (w/w), it appears that the carbonyl (C=O) group does not appear to be very important for solidification. In the case of C sub. 26 and C sub. 30 fatty acids, the replacement of hydrogen in carbonyl hydroxyl with a methyl group did not decrease the solidifying ability as compared to C sub. 26 and C sub. 30 fatty acids, suggesting that, in addition to carbonyl hydroxyl, the length of carbon chain also plays an important role in solidification.

However, it was observed that there was no significant increase in the solidification ability with very long carbon chains in the absence of a hydroxyl group as in the case of long-chain fatty acyl esters. Thus, carbonyl hydroxyl and carbon chain-length of fatty acids/derivatives were found to be important factors for solidification of organic liquids. Fatty acids and their derivatives were mixed in equal ratios by weight and used to solidify organic liquids. It was observed that there was no synergistic effect due to the mixing of the solidifiing agents.

The ability of stearic acid (solid at room temperature) to solidify fatty acids that are liquid at room temperature was studied. It was observed that the minimum quantity of stearic acid required to solidify liquid fatty acids like ethanoic acid, propanoic acid, butanoic acid, hexanoic acid, heptanoic acid, octanoic acid and nonanoic acid (C sub. 2 to C sub. 9) increased with the chain-length of the liquid fatty acid.

The rate of evaporation of volatile mineral oils and solvents was found to decrease after solidification. The rate of evapoiation was inversely proportional to the chain length of the fatty acid used for solidification.

Apart from fatty acids, it was observed that cholesterol, cholic acid and deoxycholic acid can also solidify seed oil in amounts comparable to long-chain saturated fatty acids. However, cholesteryl. oleate did not solidify seed oil even at four-fold higher concentrations.

The mechanism of the present invention may be thought of as:

a) the fatty acids by virtue of having hydrophobic and a charged hydrophilic components align themselves in a head to tail linear and perhaps perpendicular fashion to create a lattice structure with sufficient spacing for the other liquid neutral organic compounds embedded in the lattice to form a gel to solid structure.

b) alternatively, they could also form a large spherical monolayer entrapping the neutral organic compounds in the interior hydrophobic environment thus, leading to the change of liquid to solid physical form.

EXAMPLES

The following examples are provided by way of illustrations only and these should not be construed to limit the scope of the invention in any manner.

Example 1

One hundred grams of the solid kokum oil was dissolved in 200 ml of n-hexane and loaded onto a silica gel (200 g) column (pre-equilibrated with hexane) and washed the column with 2 liters of n-hexane. The n-hexane was removed from the eluted fraction by evaporation under vacuum. Specific amounts of kokum fat were mixed with the indicated amounts of sunflower oil. The tubes were heated to melt the kokum fat, and were mixed thoroughly. Then the tubes were kept at the various temperatures indicated. Table 2b summarizes the effect of the isolated kokum fat on the solidification of sunflower oil.

TABLE 2b

Solidification of sunflower oil with various concentrations of kokum fat

| Parts (w/w) | | Temperatures (deg. C) at which the mixture is solid | | | | | |
|---|---|---|---|---|---|---|---|
| Kokum Fat | Sunflower Oil | 4 | 10 | 15 | 20 | 25 | 30 |
| 0.0 | 100 | − | − | − | − | − | − |
| 2.5 | 97.5 | − | − | − | − | − | − |
| 5.0 | 95 | + | − | − | − | − | − |
| 10 | 90 | + | + | − | − | − | − |
| 15 | 85 | + | + | + | + | − | − |
| 20 | 80 | + | + | + | + | + | − |
| 25 | 75 | + | + | + | + | + | + |

'+' indicates solidification; '−' indicates no solidification

Example 2

Glycerol esters of C sub 12, C sub. 14, C sub 16 and C sub 18 fatty acids (trilaurin, trinyristin, tripalmitin, and tristearin) and hydrogenated vegetable oils were used as solidifing agents to solidify liquid oils. The above-mentioned agent was mixed at 20–40 percent of total weight with various quantities of liquid oils selected from the group comprising of edible, non-edible liquid oils, and essential oils. The mixture was heated to melt the agent and was allowed to solidify at 4 deg. C. The results are summarized in Table 3.

TABLE 3

Percentage of Glycerol Esters of Fatty Acid Used to Solidify Liquid Oils

| S.No | Solidifying Agent | Percentage Used |
|---|---|---|
| 1. | Trilaurin | 35 |
| 2. | Trimyristin | 30 |
| 3. | Tripalmitin | 25 |
| 4. | Tristearin | 20 |
| 5. | Hydrogenated Sunflower Oil | 20 |
| 6. | Hydrogenated Castor Oil | 20 |

Example 3

Various commercially available fatty acids were tested for solidification ability and the results of such experiments are given in the following examples which are provided by way of illustration and not by limitation. Saturated fatty acids from C sub. 10 to C sub. 31 were tested for their ability to solidify various organic liquids like sunflower oil, lavender oil, diesel, petrol, kerosene and acetone. Fatty acids of varying chain-lengths were mixed with the indicated amounts of oil/solvent. The tubes were heated to melt the saturated fatty acids and were kept at 25 deg. C for solidification. The melting temperatures of the solidified mixtures were determined and the results are summarized in Tables 4 and 5.

TABLE 4

Minimum Percent of Fatty Acid Required for Solidification of Organic Liquids and Melting Point (MP) of the Solidified Mixture

| S.No | Fatty Acid | Sunflower Percent | MP (deg. C) | Lavender Percent | MP (deg. C) | Diesel Percent | MP (deg. C) |
|---|---|---|---|---|---|---|---|
| 1. | Decanoic acid | 60 | 29–33 | 75 | 30–35 | 85 | 30–35 |
| 2. | Dodecanoic acid | 15 | 29–34 | 40 | 31–36 | 40 | 33–37 |
| 3. | Tetradecanoic acid | 6 | 29–35 | 20 | 38–43 | 25 | 37–42 |
| 4. | Hexadecanoic acid | 4 | 32–38 | 8 | 31–36 | 8 | 29–34 |
| 5. | Octadecanoic acid | 2 | 41–46 | 4 | 38–43 | 4 | 38–43 |
| 6. | Nonadecanoic acid | 2 | 41–48 | 5 | 31–36 | 4 | 36–41 |
| 7. | Eicosanoic acid | 2 | 48–55 | 4 | 32–39 | 4 | 37–42 |
| 8. | Heneicosanoic acid | 2 | 45–49 | 3 | 39–45 | 3 | 41–47 |
| 9. | Docosanoic acid | 2 | 52–59 | 3 | 39–45 | 3 | 47–52 |
| 10. | Tricosanoic acid | 2 | 51–57 | 4 | 41–48 | 4 | 50–55 |
| 11. | Tetracosanoic acid | 2 | 55–61 | 3 | 51–57 | 3 | 52–59 |
| 12. | Pentacosanoic acid | 2 | 59–65 | 3 | 52–59 | 3 | 51–57 |
| 13. | Hexacosanoic acid | 2 | 61–67 | 2 | 58–64 | 3 | 57–62 |
| 14. | Heptacosanoic acid | 3 | 62–69 | 3 | 57–63 | 3 | 60–65 |
| 15. | Octacosanoic acid | 1 | 63–70 | 2 | 56–61 | 3 | 60–65 |
| 16. | Nonacosanoic acid | 2 | 63–71 | 2 | 61–67 | 4 | 59–64 |
| 17. | Triacontanoic acid | 2 | 68–74 | 2 | 62–68 | 3 | 61–68 |
| 18. | Hentriacontanoic acid | 2 | 67–73 | 3 | 61–68 | 4 | 62–69 | nd = Not Determined

TABLE 5

Minimum Percent of Fatty Acid Required for Solidification of Organic Liquids and Melting Point (MP) of the Solidified Mixture

| S.No | Fatty Acid | Petrol Percent | MP (deg. C) | Kerosene Percent | MP (deg. C) | Acetone Percent | MP (deg. C) |
|---|---|---|---|---|---|---|---|
| 1. | Decanoic acid | 90 | 33–37 | 95 | 32–37 | >95 | ND |
| 2. | Dodecanoic acid | 60 | 34–38 | 60 | 30–35 | 70 | 30–35 |
| 3. | Tetradecanoic acid | 30 | 31–35 | 30 | 35–40 | 50 | 30–35 |
| 4. | Hexadecanoic acid | 20 | 30–33 | 15 | 31–38 | 30 | 30–35 |
| 5. | Octadecanoic acid | 15 | 30–33 | 12 | 46–52 | 20 | 40–45 |
| 6. | Nonadecanoic acid | 8 | 30–34 | 6 | 31–38 | 6 | 30–35 |
| 7. | Eicosanoic acid | 8 | 30–34 | 6 | 34–40 | 6 | 30–35 |
| 8. | Heneicosanoic acid | 6 | 39–43 | 5 | 36–42 | 8 | 40–45 |
| 9. | Docosanoic acid | 5 | 40–43 | 4 | 39–46 | 8 | 45–50 |
| 10. | Tricosanoic acid | 5 | 43–47 | 4 | 46–51 | 5 | 45–50 |
| 11. | Tetracosanoic acid | 5 | 44–47 | 5 | 47–54 | 3 | 40–44 |
| 12. | Pentacosanoic acid | 5 | 44–48 | 5 | 48–55 | 3 | 41–44 |
| 13. | Hexacosanoic acid | 4 | 47–51 | 5 | 53–60 | 3 | 41–45 |
| 14. | Heptacosanoic acid | 5 | 46–50 | 5 | 57–63 | nd | nd |
| 15. | Octacosanoic acid | 4 | 49–53 | 4 | 58–65 | nd | nd |
| 16. | Nonacosanoic acid | 4 | 46–50 | 5 | 59–66 | nd | nd |
| 17. | Triacontanoic acid | 4 | 55–58 | 4 | 61–67 | nd | nd |
| 18. | Hentriacontanoic acid | 4 | 54–58 | 4 | 63–70 | nd | nd | nd = Not Determined

Example 4

Modified saturated fatty acids from C sub. 6 to C sub. 30 were tested for their ability to solidify various organic liquids like sunflower oil, lavender oil, diesel, petrol, kerosene and acetone. The modified fatty acids of various chain-lengths were mixed wifh the indicated amounts of oil/solvent. The tubes were heated to melt the modified saturated fatty acids, mixed thoroughly and kept at 25 deg. C for solidification. The melting temperatures of the solidified mixtures were determined. The results are summarized in Table 6 and 7.

TABLE 6

Minimum Percent of Modified Fatty Acid Required for the Solidification of Organic Liquids and Melting Point (MP) of the Solidified Mixture

| S.No | Fatty Acid | Sunflower Percent | MP (deg. C) | Lavender Percent | MP (deg. C) | Diesel Percent | MP (deg. C) |
|---|---|---|---|---|---|---|---|
| 1. | 11-Aminoundecanoic acid | 15 | 35–40 | nd | nd | nd | nd |
| 2. | 12-Aminododecanoic acid | 40 | 38–45 | nd | nd | nd | nd |
| 3. | 2-hydroxyoctadecanoic acid | >4 | nd | nd | nd | 6 | 65–70 |
| 4. | Methyl-2-hydroxyoctadecanoic acid | >4 | nd | nd | nd | >6 | nd |
| 5. | 12-hydroxy-octadecanoic acid | 1 | 41–44 | 2 | 40–42 | 1 | 65–68 |
| 6. | Methyl-12-hydroxy-octadecanoic acid | 10 | 35–40 | >6 | nd | >6 | nd |
| 7. | 1,12-octadecanediol | 1 | 39–42 | 2 | 42–45 | 1 | 65–70 |
| 8. | threo-9,10-dihydroxy-octadecanoic acid | 1 | 50–55 | 8 | 50–55 | 10 | 83–88 |
| 9. | erythro-9,10-dihydroxy-octadecanoic acid | 4 | 81–84 | 6 | 97–102 | 14 | 120–125 |
| 10. | 1-Eicocosanol | 3 | 40–45 | 4 | 49–52 | 4 | 59–62 |
| 11. | 2-hydroxyeicasanoic acid | >4 | nd | 8 | 55–58 | 6 | 72–75 |
| 12. | Methyl-2-hydroxyeicasanoic acid | >4 | nd | nd | nd | 6 | 39–42 |
| 13. | Docosanoic acid methyl ester | 4 | 30–35 | 10 | 35–40 | 5 | 40–45 |
| 14. | 2-hydroxydocosanoic acid | >4 | nd | nd | nd | >3 | nd |
| 15. | 1-Docasanol | 3 | 43–47 | 3 | 50–53 | 3 | 42–44 |
| 16. | Behenoyl chloride | 10 | 45–50 | 12 | 55–60 | nd | nd |
| 17. | Hexacosanoic acid-methyl ester | 2 | 39–42 | 3 | 35–40 | 5 | 45–50 |
| 18. | 1-Hexacosanol | 3 | 45–48 | 2 | 39–43 | 2 | 50–52 |
| 19. | Triacontanoic acid-methyl ester | 3 | 40–43 | 2 | 37–40 | 6 | 40–45 |
| 20. | 1-Triacontanol | 4 | 55–60 | nd | nd | 3 | 62–65 |
| 21. | Adipic acid | 4 | 140–145 | 3 | 89–92 | >8 | nd |
| 22. | Suberic acid | 4 | 80–85 | 5 | 77–80 | >10 | nd |
| 23. | Sebacic acid | 4 | 80–85 | 5 | 77–80 | >10 | nd |
| 24. | Behenic anhydride | 1 | 67–70 | 5 | 48–53 | 1 | 49–53 |
| 25. | Behenic acid-myristyl ester | 2 | 35–38 | 3 | 59–62 | >5 | nd |
| 26. | Behenic acid-palmityl ester | 2 | 35–38 | 3 | 42–46 | >4 | nd |
| 27. | Behenic acid-stearyl ester | 1 | 42–45 | 2 | 48–51 | 2 | 41–43 |
| 28. | Behenic acid-arachidyl ester | 2 | 42–45 | 3 | 49–52 | 2 | 41–43 |
| 29. | Behenic acid-behenyl ester | 3 | 63–66 | nd | nd | >4 | nd | nd = Not Determined

TABLE 7

Minimum Percent of Modified Fatty Acid Required for Solidification of Organic Liquids and Melting Point (MP) of the Solidified Mixture

| S.No | Fatty Acid | Petrol Percent | MP (deg. C) | Kerosene Percent | MP (deg. C) | Acetone Percent | MP (deg. C) |
|---|---|---|---|---|---|---|---|
| 1. | 2-hydroxyoctadecanoic acid | 16 | 34–40 | nd | nd | nd | nd |
| 2. | 12-hydroxy-octadecanoic acid | 8 | 58–60 | 8 | 42–45 | 8 | 40–45 |
| 3. | Methyl-12-hydroxy-octadecanoic acid | >15 | nd | 15 | 35–37 | >8 | nd |
| 4. | 1,12-octadecanediol | 8 | 55–60 | 8 | 65–70 | 7 | 50–55 |
| 5. | threo-9,10-dihydroxy-octadecanoic acid | 20 | 88–93 | 24 | 98–103 | 15 | 55–60 |

TABLE 7-continued

Minimum Percent of Modified Fatty Acid Required for Solidification of Organic Liquids and Melting Point (MP) of the Solidified Mixture

| S.No | Fatty Acid | Petrol Percent | MP (deg. C) | Kerosene Percent | MP (deg. C) | Acetone Percent | MP (deg. C) |
|---|---|---|---|---|---|---|---|
| 6. | erythro-9,10-dihydroxy-octadecanoic acid | 20 | 97–102 | 20 | 105–110 | 15 | 60–65 |
| 7. | 1-Eicocosanol | 8 | 49–52 | 8 | 49–52 | 5 | 40–45 |
| 8. | 2-hydroxyeicasanoic acid | 8 | 45–50 | 10 | 72–75 | 10 | 55–60 |
| 9. | Methyl-2-hydroxyeicasanoic acid | >12 | nd | nd | nd | nd | nd |
| 10. | Docosanoic acid methyl ester | >15 | nd | >15 | nd | 10 | 35–40 |
| 11. | 1-Docosanol | 8 | 45–50 | 5 | 52–56 | 6 | 45–50 |
| 12. | Behenoyl chloride | >20 | nd | >20 | nd | 20 | 50–55 |
| 13. | Hexacosanoic acid-methyl ester | 8 | 40–45 | 10 | 50–55 | 10 | 50–55 |
| 14. | 1-Hexacosanol | 3 | 39–42 | 3 | 45–50 | nd | nd |
| 15. | Triacontanoic acid-methyl ester | 5 | 35–40 | 7 | 45–50 | nd | nd |
| 16. | 1-Triacontanol | 4 | 44–49 | nd | nd | nd | nd |
| 17. | Adipic acid | >20 | nd | >10 | nd | nd | nd |
| 18. | Suberic acid | >20 | nd | >10 | nd | nd | nd |
| 19. | Sebacic acid | >15 | nd | >12 | nd | nd | nd |
| 20. | Behenic anhydride | 8 | 65–70 | 10 | 75–80 | nd | nd |
| 21. | Behenic acid-myristyl ester | >15 | nd | nd | nd | nd | nd |
| 22. | Behenic acid-stearyl ester | >6 | nd | 5 | nd | nd | nd |
| 23. | Behenic acid-arachidyl ester | >7 | nd | 5 | nd | nd | nd |
| 24. | Behenic acid-behenyl ester | >7 | nd | >7 | nd | nd | nd | nd = Not Determined

Example 5

Stearic acid was used as an agent to solidify various organic liquids like solvents, ethanol, methanol, liquid fatty acids, and triolein. Stearic acid was mixed with various amounts of organic liquids and tubes heated to melt the agent. After thorough mixing, the tubes were left at 25 deg. C for solidification. The melting temperatures of the solidified mixtures were determined. The results are summarized in Table 8.

TABLE 8

Other Organic Liquids Solidified With Fatty Acid

| Organic Liquid | Percent Stearic acid Used For Solidification | Melting Temperature (Deg. C) |
|---|---|---|
| Dimethylsulfoxide | 7 | 35–40 |
| Dimethylformamide | 10 | 43–48 |
| Tetrahydrofuran | 10 | 66–69 |
| Acetonitrile | 10 | 64–68 |
| Ethanol | 10 | 37–42 |
| Methanol | 10 | 38–44 |
| Acetic acid (C2) | 4 | 35–40 |
| Propionic acid (C3) | 10 | 35–40 |
| Butyric acid (C4) | 12 | 40–45 |
| Hexanoic/Caproic acid(C6) | 12 | 40–45 |
| Heptanoic acid (C7) | 14 | 40–45 |
| Octanoic/Caprylic acid(C8) | 14 | 40–45 |
| Nonanoic/Pelargonic acid(C9) | 15 | 40–45 |
| Oleic Acid | 9 | 47–51 |
| Triolein | 6 | 48–53 |

Example 6

Stearic acid was used as the agent to solidify various essential oils. Stearic acid was mixed with various amounts of essential oils and the tubes were heated to melt the agent. After thorough mixing, the tubes were left at 25 deg. C for solidification. The results are summarized in Table 9.

TABLE 9

Essential Oils Solidified With Fatty Acid

| Essential Oil | Percent stearic acid Used For Solidification |
|---|---|
| Peppermint Oil | 15 |
| Geranium Oil | 11 |
| Geraniol | 11 |
| Rose Oil | 10 |
| Lemongrass Oil | 10 |
| Jojoba Oil | 5 |
| Neem Oil | 5 |
| Lavender Oil | 5 |
| Karanj Oil | 5 |

Example 7

Sterols like cholesterol and deoxycholic acid and sterol esters like cholesteryl oleate were tested for their ability to solidify sunflower oil. Each one of these agents was mixed with various amounts of sunflower oil and the vessels heated to melt the agent. Following heating, the contents of the tubes were mixed thoroughly and kept at 25 deg. C for solidification. The data is summarized in Table 10.

TABLE 10

Solidification Of Sunflower Oil With Other Agents

| Agent | Minimum Percent Required |
|---|---|
| Cholesteryl Oleate | >15% |
| Cholesterol | 4% |
| Deoxycholate | 4% |

Example 8

The mixture of fatty acids, modified fatty acids and fatty alcohols, were used in 1:1 ratio for solidification of organic liquids. The above-mentioned 1:1 mixtures of agents were mixed with the indicated amounts of oil/solvent. The tubes were heated to melt the agents and the contents were mixed thoroughly. The tubes were then kept at 25 deg. C for solidification. The melting temperatures of the solidified mixtures were determined. The data is summarized in Tables 11a–11b.

Mixtures of Two Solidifying Agents

TABLE 11a

Stearic acid + 12-hydroxy-stearic acid

| Sunflower | | Lavender | | Diesel | |
|---|---|---|---|---|---|
| Percent | MP | Percent | MP | Percent | MP |
| >2 | nd | >4 | nd | 3 | 45–50° C. |

TABLE 11b

Stearic acid + 12-hydroxy-stearyl alcohol

| Sunflower | | Lavender | | Diesel | | Petrol | | Kerosene | |
|---|---|---|---|---|---|---|---|---|---|
| Percent | MP | Percent | MP | Percent | MP | Percent | MP | Percent | MP |
| >2 | nd | >4 | nd | 4 | 45–50° C. | 15 | 45–50° C. | 12 | 45–50° C. |

TABLE 11c threo-9,10-Dihydroxy-stearic acid + Adipic Acid

| Sunflower | | Lavender | |
|---|---|---|---|
| Percent | MP | Percent | MP |
| 5 | 75–80° C. | 8 | 100–105° C. |

TABLE 11d

Behenic acid + Behenyl-alcohol

| Sunflower | | Lavender | | Diesel | | Petrol | | Kerosene | | Acetone | |
|---|---|---|---|---|---|---|---|---|---|---|---|
| Percent | MP | Percent | MP | Percent | MP | Percent | MP | Percent | MP | Percent | MP |
| 3 | 35–40° C. | >3 | nd | 3 | 40–45° C. | 3 | 40–45° C. | 5 | 40–45° C. |  | 40–45° C. |

TABLE 11e

Behenic acid + Behenic-anhydride

| Sunflower | | Lavender | | Diesel | | Petrol | | Kerosene | | Acetone | |
|---|---|---|---|---|---|---|---|---|---|---|---|
| Percent | MP | Percent | MP | Percent | MP | Percent | MP | Percent | MP | Percent | MP |
| 2 | 45–50° C. | 5 | 50–55° C. | 5 | 55–60° C. | 12 | 45–50° C. | 8 | 45–50° C. |  | 40–45° C. |

TABLE 11f

| Behenyl-alcohol + Adipic Acid | | | |
|---|---|---|---|
| Sunflower | | Lavender | |
| Percent | MP | Percent | MP |
| 4 | 70–75° C. | >3 | nd |

TABLE 11g

| Hexacosanoic acid + Hexacosanol | | | | | | | |
|---|---|---|---|---|---|---|---|
| Sunflower | | Lavender | | Diesel | | Petrol | |
| Percent | MP | Percent | MP | Percent | MP | Percent | MP |
| 3 | 40–45° C. | 2 | 45–50° C. | 3 | 45–50° C. | 6 | 40–45° C. |

1:1 (w/w) mixture used at the indicated total percentage
nd = Not Determined
MP = Melting Point of the solid

Example 9

Mixtures of four solidifying agents showing the best solidification properties were used in equal ratio (1:1:1:1) mixtures for solidifiing organic liquids. The solidifiing agents were mixed with various organic liquids and the tubes heated to melt the agents. The contents of the tubes were mixed thoroughly and the tubes kept at 25 deg. C for solidification. The melting temperatures of the solids were determined. The data is summarized in Tables 12a and 12b.
Mixtures of Four Solidifying Agents

Example 10

The change in rates of evaporation of volatile organic liquids like mineral oils and solvents after solidification was studied. The volatile organic liquids were mixed with appropriate amounts of solidifing agent (stearic acid or behenic acid) and the tubes were heated to melt the agent. The contents of the tubes were mixed thoroughly and the tubes were kept at 25 deg. C for solidification. The solidified liquids were incubated at 25 deg. C for 12 h and the respective decreases in weight were recorded and compared with the appropriate controls. The results are summarized in Tables 13 and 14.

TABLE 12a

| Stearic acid + 12-hydroxy-stearyl-alcohol + Behenic acid + Behenyl-alcohol | | | | | | | | | | | |
|---|---|---|---|---|---|---|---|---|---|---|---|
| Sunflower | | Lavender | | Diesel | | Petrol | | Kerosene | | Acetone | |
| Percent | MP | Percent | MP | Percent | MP | Percent | MP | Percent | MP | Percent | MP |
| 4 | 35–40° C. | 6 | 35–40° C. | 5 | 40–45° C. | 13 | 40–45° C. | 10 | 55–60° C. |  | 40–45° C. |

TABLE 12b

| Stearic acid + threo-9,10-dihydroxy-stearic acid + Behenic acid + Behenic-anhydride | | | | | | | | | |
|---|---|---|---|---|---|---|---|---|---|
| Sunflower | | Lavender | | Diesel | | Petrol | | Kerosene | |
| Percent | MP | Percent | MP | Percent | MP | Percent | MP | Percent | MP |
| 3 | 43–47° C. | 7 | 45–50° C. | 9 | 65–70° C. | 16 | 65–70° C. | 19 | 80–85° C. |

1:1:1:1 (by weight) mixture of four fatty acids used at the indicated total percentage
nd = Not Determined
MP = Melting Point of the solid

TABLE 13

Rate of Evaporation of Solidified Volatile Organic Liquids

| | Solidified With Stearic or Behenic acids | | | | Control | |
| --- | --- | --- | --- | --- | --- | --- |
| Organic Liquid | Percent C18:0 | Percent Drop in Weight | Percent C22:0 | Percent Drop in Weight | | Percent Drop in Weight |
| Diesel | 4 | 0.45 | 3 | 0.00 | Only Diesel | 1.10 |
| Petrol | 15 | 6.60 | 6 | 10.00 | Only Petrol | 15.00 |
| Kerosene | 12 | 1.10 | 2 | 0.76 | Only Kerosene | 1.70 |
| Acetone | 10 | 86.00 | 2 | 67.0 | Only Acetone | 86.00 |

TABLE 14

Decrease in Evaporation Rate After Solidification

| Oil | Solidified with Stearic Acid | Solidified with Behenic Acid |
| --- | --- | --- |
| Diesel | 59% | 100% |
| Petrol | 56% | 33% |
| Kerosene | 35% | 55% |
| Acetone | 0% | 22% |

Example 11

Methods of solidifying sunflower oil are given in the Example 11.

a) Five grams of stearic acid were taken in a 250-ml beaker and heated to melt the said fatty acid. To the melted fatty acid, 95 grams of commercially available sunflower oil was added and mixed by stirring. The mixture was heated up to 70 deg. C and mixture cooled at 4 deg. C for 15 minutes. After cooling, the mixture was incubated at 26 to 28 deg. C for about 2 hours. The solidified product remained solid at ambient temperature. The melting temperature of the solid was determined.

b) Four grams of behenic acid were taken in a 250-ml beaker and heated to melt the said fatty acid. To the melted fatty acid, 95 grams of commercially available sunflower oil was added and mixed by stirring. The mixture was heated up to 80 deg. C and the mixture cooled at 4 deg. C for 15 minutes. After cooling, the mixture was incubated at 26 to 28 deg. C for about 2 hours. The solidified product remained solid at ambient temperature. The melting temperature of the solid was determined.

c) Five grams of stearic acid were taken in a 250-ml beaker and heated to melt the said fatty acid. To the melted fatty acid, 95 grams of sunflower oil was added and mixed by stirring. The mixture was heated up to 70 deg. C and the mixture cooled and incubated at 26 to 28 deg. C for about 2 hours. The solidified product remained solid at ambient temperature. The melting temperature of the solid was determined.

d) Four grams of behenic acid was taken in a 250-mil beaker and heated to melt the said fatty acid. To the melted fatty acid, 95 grams of commercially available sunflower oil was added and mixed by stirring. The mixture was heated up to 80 deg. C The mixture was cooled and kept at 26 to 28 deg. C for about 2 hours. The solidified product remained solid at ambient temperature. The melting temperature of the solid was determined.

The results are summarized in Table 15.

Example 12

Methods of solidifying mustard oil are given in Example 12.

a) Five grams of stearic acid were taken in a 250-ml beaker and heated to melt the said fatty acid. To the melted fatty acid, 95 gram of mustard oil was added and mixed by stirring. The mixture was heated up to 70 deg. C and mixture cooled at 4 deg. C for 15 minutes. After cooling, the mixture was incubated at 26 to 28 deg. C for about 2 hours. The solidified product remained solid at ambient temperature. The melting temperature of the solid was determined.

b) Five grams of behenic acid were taken in a 250-ml beaker and heated to melt the said fatty acid. To the melted fatty acid, 95 grams of mustard oil was added and mixed by stirring. The mixture was heated up to 80 deg. C and mixture cooled at 4 deg. C for 15 minutes. After cooling, the mixture was incubated at 26 to 28 deg. C. for about 2 hours. The solidified product remained solid at ambient temperature. The melting temperature of the solid was determined.

c) Five grams of stearic acid were taken in a 250-ml beaker and heated to melt the said fatty acid. To the melted fatty acid, 95 grams of mustard oil was mixed by stirring. The mixture was heated up to 70 deg. C and the mixture incubated at 26 to 28 deg. C The solidified product remained solid at ambient temperature. The melting temperature of the solid was determined.

d) Four grams of behenic acid were taken in a 250-ml beaker and heated to melt the said fatty acid. To the melted fatty acid, 95 grams of commercially available mustard oil was added and mixed by stirring. The mixture was heated up to 80 deg. C The mixture was incubated at 26 to 28. deg. C The solidified product remained solid at ambient temperature. The melting temperature of the solid was determined.

The results are summarized in Table 15.

Example 13

Methods of solidifing Groundnut oil are given Example 13.

a) Five grams of stearic acid were taken in a 250-ml beaker and heated to melt the said fatty acid. To the melted fatty acid, 95 grams of groundnut oil was mixed by stirring. The mixture was heated up to 70 deg. C and mixture cooled at 4 deg. C for 15 minutes. After cooling, the mixture was mcubated at 26 to 28 deg. C. The solidified product remained solid at ambient temperature. The melting temperature of the solid was determined.

b) Five grais of behenic acid were taken in a 250-ml beaker and heated to melt the said fatty acid. To the melted fatty acid, 95 grams of groundnut oil was added and mixed by stirring. The mixture was heated up to 80 deg. C and mixture cooled at 4 deg. C. After cooling, the mixture was incubated at 26 to 28 deg. C. The solidified product remained solid at ambient temperature. The melting temperature of the solid was determined.

c) Five grams of stearic acid were taken in a 250-ml beaker and heated to melt the said fatty acid. To the melted fatty acid, 95 grams of groundnut oil was added and mixed by sthring. The mixture was heated up to 70 deg. C and the mixture incubated at 26 to 28 deg. C. Tfhe solidified product remained solid at ambient temperature. The melting temperature of the solid was determined.

d) Four grams of behenic acid were taken in a 250-ml beaker and heated to melt the said fatty acid. To the melted fatty acid, 95 grams of commercially available groundnut oil was added and mixed by stirring. The mixture was heated up to 80 deg. C. The mixture was incubated at 26 to 28 deg. C. The solidified product remained solid at ambient temperature. The melting temperature of the solid was determined.

The results are summarized in Table 15.

Example 14

Methods of solidifyg castor oil are given in Example 14.

a) Five grams of stearic acid were taken in a 250-ml beaker and heated to melt the said fatty acid. To the melted fatty acid, 95 grams of castor oil was added and mixed by stirring. The mixture was heated up to 70 deg. C and mixture cooled at 4 deg. C. After cooling, the mixture was incubated at 26 to 28 deg. C. The solidified product remained solid at ambient temperature. The melting temperature of the solid was determined.

b) Five grams of behenic acid were taken in a 250-ml beaker and heated to melt the said fatty acid. To the melted fatty acid, 95 grams of castor oil was added and mixed by stirring. The mixture was heated up to 80 deg. C and mixture cooled at 4 deg. C. After cooling, the mixture was incubated at 26 to 28 deg. C. The solidified product remained solid at ambient temperature. The melting temperature of the solid was determined.

c) Five grams of stearic acid was taken in a 250-ml beaker and heated to melt the said fatty acid. To the melted fatty acid, 95 grams of castor oil was added and mixed by stirring. The mixture was heated up to 70 deg. C and the mixture incubated at 26 to 28 deg. C. The solidified product remained solid at ambient temperature. The melting temperature of the solid was determined.

d) Four grams of behenic acid was taken in a 250-ml beaker and heated to melt the said fatty acid. To the melted fatty acid, 95 grams of commercially available castor oil was added and mixed by stirring. The mixture was heated up to 80 deg. C. The mixture was kept at 26 to 28 deg. C. The solidified product remained solid at ambient temperature. The melting temperature of the solid was determined.

The results are summarized in Table 15.

Example 15

Methods of solidifying geraniol are given in Example 15.

a) Five grams of stearic acid were taken in a 250-ml beaker and heated to melt the said fatty acid. To the melted fatty acid, 95 grams of commercially available geraniol were added and mixed by stirring. The mixture was heated up to 70 deg. C and mixture cooled at 4 deg. C for 15 minutes. After cooling, the mixture was incubated at 26 to 28 deg. C for about 2 hours. The solidified product remained solid at ambient temperature. The melting temperature of the solid was determined.

b) Four grams of behenic acid were taken in a 250-ml beaker and heated to melt the said fatty acid. To the melted fatty acid, 95 grams of commercially available geraniol was added and mixed by stirring. The mixture was heated up to 80 deg. C and the mixture cooled at 4 deg. C for 15 minutes. After cooling, the mixture was incubated at 26 to 28 deg. C for about 2 hours. The solidified product remained solid at ambient temperature. The melting temperature of the solid was determined.

c) Five grams of stearic acid were taken in a 250-ml beaker and heated to melt the said fatty acid. To the melted fatty acid, 95 grams of commercially available geraniol were added and mixed by stirring. The mixture was heated up to 70 deg. C and the mixture was incubated at 26 to 28 deg. C for about 2 hours. The solidified product remained solid at ambient temperature. The melting temperature of the solid was determined.

d) Four grams of behenic acid were taken in a 250-ml beaker and heated to melt the said fatty acid. To the melted fatty acid, 95 grams of commercially available geraniol was added and mixed by stuoig. The mixture was heated up to 8 deg. C and the mixture was incubated at 26 to 28 deg. C for about 2 hours. The solidified product remained solid at ambient temperature. The melting temperature of the solid was determined.

The results are summarized in Table 15.

Example 16

Methods of solidifyng citral are given in Example 16.

a) Five grams of stearic acid were taken in a 250-ml beaker and heated to melt the said fatty acid. To the melted fatty acid, 95 grams of commercially available citral were added and mixed by stirring. The mixture was heated up to 70 deg. C and mixture cooled at 4 deg. C for 15 minutes. After cooling, the mixture was incubated at 26 to 28 deg. C for about 2 hours. The solidified product remained solid at ambient temperature. The melting temperature of the solid was determined.

b) Four grams of behenic acid were taken in a 250-ml beaker and heated to melt the said fatty acid. To the melted fatty acid, 95 grams of commercially available citral was added and mixed by stirring. The mixture was heated up to 80 deg. C and the mixture cooled at 4 deg. C for 15 minutes. After cooling, the mixture was incubated at 26 to 28 deg. C for about 2 hours. The solidified product remained solid at ambient temperature. The melting temperature of the solid was determined.

c) Five grams of stearic acid were taken in a 250-ml beaker and heated to melt the said fatty acid. To the melted fatty acid, 95 grams of commercially available citral were added and mixed by stirring. The mixture was heated up to 70 deg. C and the mixture was incubated at 26 to 28 deg. C. for about 2 hours. The solidified product remained solid at ambient temperature. The melting temperature of the solid was determined.

d) Four grams of behenic acid were taken in a 250-ml beaker and heated to melt the said fatty acid. To the melted fatty acid, 95 grams of commercially available citral was added and mixed by stirring. The mixture was heated up to 80 deg. C and the mixture was incubated at 26 to 28 deg. C. for about 2 hours. The solidified product remained solid at ambient temperature. The melting temperature of the solid was determined.

The results are summarized in Table 15.

Example 17

Methods of solidifying diesel are given in Example 17.

a) Five grams of stearic acid were taken in a 250-ml beaker and heated at 70 deg. C to melt the said fatty acid. To the melted fatty acid, 95 grams of commercially available diesel was added and mixed by stirring. The mixture was heated up to 50 deg. C and mixture cooled at 4 deg. C for 15 minutes. After cooling, the mixture was incubated at 26 to 28 deg. C for about 2 hours. The solidified product remained solid at ambient temperature. The melting temperature of the solid was determined.

b) Four grams of behenic acid were taken in a 250-ml beaker and heated at 80 deg. C to melt the said fatty acid. To the melted fatty acid, 95 grams of commercially available diesel was added and mixed by stirring. The mixture was heated up to 50 deg. C and the mixture cooled at 4 deg. C for 15 minutes. After cooling, the mixture was incubated at 26 to 28 deg. C for about 2 hours. The solidified product remained solid, at ambient temperature. The melting temperature of the solid was determined.

c) Five grams of stearic acid were taken in a 250-ml beaker and heated at 70 deg. C to melt the said fatty acid. To the melted fatty acid, 95 grams of diesel was added and mixed by stirring. The mixture was heated up to 50 deg. C and the mixture cooled and incubated at 26 to 28 deg. C. for about 2 hours. The solidified product remained solid at ambient temperature. The melting temperature of the solid was determined.

d) Four grams of behenic acid was taken in a 250-ml beaker and heated at 80 deg. C to melt the said fatty acid. To the melted fatty acid, 95 grams of commercially available diesel was added and mixed by stirring. The mixture was heated up to 50 deg. C. The mixture was cooled and kept at 26 to 28 deg. C. for about 2 hours. The solidified product remained solid at ambient temperature. The melting temperature of the solid was determined.

The results are summarized in Table 15.

Example 18

Methods of solidifying kerosene are given in Example 18.

a) Five grams of stearic acid were taken in a 250-ml beaker and heated at 70 deg. C to melt the said fatty acid. To the melted fatty acid, 95 grams of commercially available kerosene was added and mixed by stirring. The mixture was heated up to 50 deg. C and rmixture cooled at 4 deg. C. for 15 minutes. After cooling, the mixture was incubated at 26 to 28 deg. C. for about 2 hours. The solidified product remained solid at ambient temperature. The melting temperature of the solid was determined.

b) Four grams of behenic acid were taken in a 250-ml beaker and heated at 80 deg. C to melt the said fatty acid. To the melted fatty acid, 95 grams of commercially available kerosene was added and mixed by stirring. The mixture was heated up to 50 deg. C and the mixture cooled at 4 deg. C. for 15 minutes. After cooling, the mixture was incubated at 26 to 28 deg. C. for about 2 hours. The solidified product remained solid at ambient temperature. The melting temperature of the solid was determined.

c) Five grams of stearic acid were taken in a 250-ml beaker and heated at 70 deg. C to melt the said fatty acid. To the melted fatty acid, 95 grams of kerosene was added and mixed by stirring. The mixture was heated up to 50 deg. C and the mixture cooled and incubated at 26 to 28 deg. C. for about 2 hours. The solidified product remained solid at ambient temperature. The melting temperature of the solid was determined.

d) Four grams of behenic acid was taken in a 250-ml beaker and heated at 80 deg. C to melt the said fatty acid. To the melted fatty acid, 95 grams of commercially available kerosene was added and mixed by stirring. The mixture was heated up to 50 deg. C. The mixture was cooled and kept at 26 to 28 deg. C for about 2 hours. The solidified product remained solid at ambient temperature. The melting temperature of the solid was determined.

The results are summarized in Table 15.

Example 19

Methods of solidifying acetone are given in Example 19.

a) Five grams of stearic acid were taken in a 250-ml beaker and heated at 70 deg. C to melt the said fatty acid. To the melted fatty acid, 95 grams of commercially available acetone was added and mixed by stirring. The mixture was heated up to 40 deg. C and mixture cooled at 4 deg. C. for 15 minutes. After cooling, the mixture was incubated at 26 to 28 deg. C. for about 2 hours. The solidified product remained solid at ambient temperature. The melting temperature of the solid was determined.

b) Four grams of behenic acid were taken in a 250-ml beaker and heated at 80 deg. C to melt the said fatty acid. To the melted fatty acid, 95 grams of commercially available acetone was added and mixed by stirring. The mixture was heated up to 40 deg. C and the mixture cooled at 4 deg. C. for 15 minutes. After cooling, the mixture was incubated at 26 to 28 deg. C. for about 2 hours. The solidified product remained solid at ambient temperature. The melting temperature of the solid was determined.

c) Five grams of stearic acid were taken in a 250-ml beaker and heated at 70 deg. C to melt the said fatty acid. To the melted fatty acid, 95 grams of acetone were added and mixed by stirring. The mixture was heated up to 40 deg. C and the mixture cooled and incubated at 26 to 28 deg. C. for about 2 hours. The solidified product remained solid at ambient temperature. The melting temperature of the solid was determined.

d) Four grams of behenic acid was taken in a 250-ml beaker and heated at 80 deg. C to melt the said fatty acid. To the melted fatty acid, 95 grams of commercially available acetone was added and mixed by stirring. The mixture was heated up to 40 deg. C. The mixture was cooled and kept at 26 to 28 deg. C. for about 2 hours. The solidified product remained solid at ambient temperature. The melting temperature of the solid was determined.

The results are summarized in Table 15.

Example 20

Methods of solidifying methanol/alcohol are given in Example 20.

a) Five grams of stearic acid were taken in a 250-ml beaker and heated at 70 deg. C to melt the said fatty acid. To the melted fatty acid, 95 grams of commercially available methanol was added and mixed by stirring. The mixture was heated up to 40 deg. C and mixture cooled at 4 deg. C. for 15 minutes. After cooling, the mixture was incubated at 26 to 28 deg. C. for about 2 hours. The solidified product remained solid at ambient temperature. The melting temperature of the solid was determined.

b) Four grams of behenic acid were taken in a 250-ml beaker and heated at 80 deg. C to melt the said fatty acid. To the melted fatty acid, 95 grams of commercially available methanol was added and mixed by stiring. The mixture was heated up to 40 deg. C and the mixture cooled at 4 deg. C for 15 minutes. After cooling, the mixture was incubated at 26 to 28 deg. C for about 2 hours. The solidified product remained solid at ambient temperature. The melting temperature of the solid was determined.

c) Five grams of stearic acid were taken in a 250-ml beaker and heated at 70 deg. C to melt the said fatty acid. To the melted fatty acid, 95 grams of alcohol were added and mixed by stirring. The mixture was heated up to 40 deg. C and the mixture cooled and incubated at 26 to 28 deg. C. for about 2 hours. The solidified product remained solid at ambient temperature. The melting temperature of the solid was determined.

d) Four grams of behenic acid was taken in a 250-ml beaker and heated at 80 deg. C to melt the said fatty acid. To the melted fatty acid, 95 grams of commercially available alcohol was added and mixed by stirring. The mixture was heated up to 40 deg. C. The mixture was cooled and kept at 26 to 28 deg. C for about 2 hours. The solidified product remained solid at ambient temperature. The melting temperature of the solid was determined.

The results are summarized in Table 15.

Example 21

Methods of solidifying dimethyl sulfoxide are given in Example 21.

a) Five grams of stearic acid were taken in a 250-ml beaker and heated at 70 deg. C to melt the said fatty acid. To the melted fatty acid, 95 grams of commercially available dimethyl sulfoxide was added and mixed by stirring. The mixture was heated up to 40 deg. C and mixture cooled at 4 deg. C for 15 minutes. After cooling, the mixture was incubated at 26 to 28 deg. C for about 2 hours. The solidified product remained solid at ambient temperature. The melting temperature of the solid was determined.

b) Four grams of behenic acid were taken in a 250-ml beaker and heated at 80 deg. C to melt the said fatty acid. To the melted fatty acid, 95 grams of commercially available dimethyl sulfoxide was added and mixed by stirring. The mixture was heated up to 40 deg. C and the mixture cooled at 4 deg. C for 15 minutes. After cooling, the mixture was incubated at 26 to 28 deg. C for about 2 hours. The solidified product remained solid at ambient temperature. The melting temperature of the solid was determined.

c) Five grams of stearic acid were taken in a 250-ml beaker and heated at 70 deg. C to melt the said fatty acid. To the melted fatty acid, 95 grams of dimethyl sulfoxide were added and mixed by stirring. The mixture was heated up to 40 deg. C and the mixture cooled and incubated at 26 to 28 deg. C for about 2 hours. The solidified product remained solid at ambient temperature. The melting temperature of the solid was determined.

d) Four grams of behenic acid was taken in a 250-ml beaker and heated at 80 deg. C to melt the said fatty acid. To the melted fatty acid, 95 grams of commercially available dimethyl sulfoxide was added and mixed by stirring. The mixture was heated up to 40 deg. C. The mixture was cooled and kept at 26 to 28 deg. C for about 2 hours. The solidified product remained solid at ambient temperature. The melting temperature of the solid was determined.

The results are summarized in Table 15.

TABLE 15

Solidification of Organic Liquids with Stearic or Behenic acids

| Example Organic Liquid | Percent Stearic Acid | Melting Point Rapid Cooled (deg. C) | Melting Point Slow Cooled (deg. C) | Percent Behenic Acid | Melting Point Rapid Cooled (deg. C) | Melting Point Slow Cooled (deg. C) |
|---|---|---|---|---|---|---|
| Sunflower | 5 | 38–42 | 41–46 | 4 | 51–57 | 53–57 |
| Mustard | 5 | 37–40 | 38–44 | 4 | 50–54 | 51–57 |
| Groundnut | 5 | 37–44 | 42–45 | 4 | 50–55 | 49–55 |
| Castor | 5 | 34–39 | 38–42 | 4 | 47–51 | 46–51 |
| Geraniol | 5 | 30–34 | 33–38 | 4 | 31–35 | 39–47 |
| Citral | 5 | 33–40 | 36–42 | 4 | 37–43 | 41–48 |
| Diesel | 5 | 32–37 | 32–39 | 4 | 44–47 | 47–53 |
| Kerosene | 12 | 42–47 | 46–52 | 8 | 41–45 | 43–47 |
| Acetone | 20 | 38–43 | 40–44 | 8 | 43–48 | 45–50 |
| Methanol | 10 | 38–44 | 40–45 | 8 | 53–57 | 54–58 |
| Dimethyl Sulfoxide | 7 | 33–39 | 35–40 | 8 | 53–56 | 55–57 |

Rapid Cooled = The melt was kept at 4 deg. C for solidification;
Slow Cooled = The melt was kept at 25 deg. C for solidification.

Liquefaction of the Solid/semi-solid Preparation Made by the Addition of Free Fatty Acids The method of liquefaction of the solid/semi-solid preparations consisted of taking 100 grams of the solid, melting it to the state of liquid. To the melted mixture, 17 grams of sodium hydroxide (17 percent weight/weight aqueous sodium hydride solution) was added and stirred for 10 minutes. After alkali treatment, the mixture was filtered. To the filtrate equal amount of hot water was added, stirred and allowed to settle. The aqueous layer was removed and the process was repeated again. The moisture in the oil was removed under reduced pressure.

Recovery of Added Fatty Acid

The free fatty acid added in the original preparation was removed by the alkaline treatment as described above. Fifty milliliters of concentrated hydrochloric acid (12 N) was added until the pH became acidic and the free fatty acid was separated by filtration. Alternatively, the added fatty acids or their glycerol esters were recovered by fractional distillation.

Recovery of Added Other Solidifying Agent

The added solidifiing agent was recovered by conventional fractional distillation process.

Example 22

Liquefaction of the solid/semi-solid preparation made by the addition of free fatty acids.

The method of liquefaction of the solid/semi-solid preparations consisted of taking 100 grams of the solidified mixture, melting it to the state of liquid. To the melted mixture, 17 grams of sodium hydroxide (17 percent weight/weight aqueous sodium hydroxide solution) was added and stirred for 10 minutes. After alkali treatment, the mixture was filtered to remove the salts of fatty acids. The filtrate (starting commodity) was recovered. Excess or unreacted sodium hydroxide in the filtrate was removed by the addition of equal amount of hot water, stirred and allowed to settle. The aqueous layer was removed and discarded. The moisture in the oil was removed under reduced pressure.

In an another method, the solidified oil or solidified organic solvent was melted to liquefy the solid.

Example 23

Recovery of added fatty acid.

The free fatty acid added for solidification was removed by the alkaline treatment as described in Example 22. Fifty milliliters of concentrated hydrochloric acid (12 N) was added until the pH became acidic and the free fatty acid was separated by filtration. Alternatively, the added fatty acids or their glycerol esters were recovered by fractional distillation.

Example 24

Recovery of added other

One hundred gram of solidified solid/semi-solid preparations was melted to liquid state and distilled the mixture to separate the added solidifying agent. The solidified commodity was recovered also by conventional fractional distillation process.

What is claimed is:

1. A process for producing a novel synergistic solid/semi-solid organic composition, said process comprising mixing (a) 0.1 to 40 percent by weight of at least one saturated long chain fatty acid and/or its glycerol esters, or at least one saturated long chain fatty alcohols, or at least one dicarboxylic acid, or at least one sterol or mixtures thereof with (b) a liquid neutral organic compound, at a pressure in the range of 200 torr to 2500 torr; wherein said mixture includes decanoic acid having an additional carboxylic acid group at the methyl end thereof which is found to enhance the solidification ability by more than ten-fold over decanoic acid and $C_6$ to $C_{10}$ dicarboxylic acids, solidified seed oils and essential oils.

2. A process as claimed in claim 1, further comprising melting the solidified mixture to its liquid state, adding an aqueous sodium hydroxide solution to the melted mixture and stirring for 10 minutes, after the alkali treatment, filtering the mixture to remove the salts of fatty acids, recovering the filtrate, removing excess or unreacted sodium hydroxide in the filtrate by the addition of equal amounts of hot water, stirring and allowing the mixture to settle, removing and discarding the aqueous layer and removing the moisture in the oil under reduced pressure.

3. A process as claimed in claim 1, further comprising melting the solidified oil or solidified organic solvent to liquefy the solid, removing the free fatty acid added for solidification by alkaline treatment, adding concentrated hydrochloric acid until the pH is acidic and separating the free fatty acid by filtration, or recovering the added fatty acids or their glycerol esters by fractional distillation.

4. A process as claimed in claim 1, further comprising melting the solidified solid/semi-solid preparation to liquid state and distilling to separate the added solidifying agent or the solidified ingredient.

5. A process for producing a novel, reversible and synergistic solid/semi-solid organic composition, said process comprising mixing (a) 0.1 to 40 percent by weight of at least one saturated long chain fatty acid and/or its glycerol esters, or at least one saturated long chain fatty alcohols, or at least one dicarboxylic acid, or at least one sterol or mixtures thereof with (b) a liquid neutral organic compound, at a pressure in the range of 200 torr to 2500 torr and thereby solidify the organic composition; liquefying the solid/semi-solid which is subjected to alkali treatment; filtering the mixture and thereby obtaining the ingredients (a) and (b).

* * * * *